(12) United States Patent
Hazard

(10) Patent No.: US 8,089,967 B2
(45) Date of Patent: Jan. 3, 2012

(54) MODIFICATION OF A SWITCHING TABLE OF AN INTERNET PROTOCOL SWITCH

(75) Inventor: Ludovic Hazard, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 12/060,304

(22) Filed: Apr. 1, 2008

(65) Prior Publication Data

US 2008/0247399 A1    Oct. 9, 2008

(30) Foreign Application Priority Data

Apr. 6, 2007  (EP) .................................... 07300934

(51) Int. Cl.
*H04L 12/28* (2006.01)
*H04L 12/56* (2006.01)
(52) U.S. Cl. ................. 370/395.31; 370/395.3; 711/221
(58) Field of Classification Search .............. 370/395.31
See application file for complete search history.

(56) References Cited

U.S. PATENT DOCUMENTS

| 7,643,486 | B2 | 1/2010 | Belz et al. |
|---|---|---|---|
| 2003/0101243 | A1* | 5/2003 | Donahue et al. ............. 709/220 |
| 2003/0110344 | A1 | 6/2003 | Szczepanek et al. |
| 2004/0128389 | A1 | 7/2004 | Kopchik |
| 2005/0097610 | A1* | 5/2005 | Pedlow et al. .................. 725/80 |
| 2005/0122825 | A1 | 6/2005 | Tzeng |
| 2005/0249199 | A1* | 11/2005 | Albert et al. .................. 370/352 |
| 2007/0047546 | A1 | 3/2007 | Deguchi et al. |
| 2007/0121617 | A1 | 5/2007 | Kanekar et al. |
| 2008/0130490 | A1 | 6/2008 | Yu et al. |
| 2008/0247395 | A1 | 10/2008 | Hazard |
| 2008/0247396 | A1 | 10/2008 | Hazard |
| 2008/0250492 | A1 | 10/2008 | Hazard |
| 2010/0034200 | A1 | 2/2010 | MeLampy et al. |

(Continued)

FOREIGN PATENT DOCUMENTS

GB    2381922 A    5/2003

(Continued)

OTHER PUBLICATIONS

Non-Final Office Action (Mail Date Dec. 8, 2009) for U.S. Appl. No. 12/058,786—Filing Date Mar. 31, 2008; Confirmation No. 3883.

(Continued)

*Primary Examiner* — Daniel Wu
*Assistant Examiner* — Frederick Ott
(74) *Attorney, Agent, or Firm* — Schmeiser, Olsen & Watts; John Pivnichny

(57) ABSTRACT

Methods for modifying a switching table of an Internet Protocol (IP) switch. The methods include: receiving a dynamic host configuration protocol (DHCP) option 43 request from a host of a LAN at an access port of the IP switch; transmitting the request to a DHCP server; intercepting a DHCP response for the request from the DHCP server; extracting an IP address from the intercepted DHCP response; and adding the extracted IP address to a corresponding entry (specific to the access port) of a switching table of the IP switch. The methods include: receiving an IP frame at an access port of the IP switch; reading an IP source address from the IP frame; and in the switching table either: creating a new entry including the IP source address and its associated port identifier or changing an existing entry based on the IP source address and the access port.

25 Claims, 11 Drawing Sheets

U.S. PATENT DOCUMENTS

2010/0189105 A1      7/2010    Wentink

FOREIGN PATENT DOCUMENTS

WO      WO03/105406 A1      12/2003
WO      WO2004/036447 A1      4/2004

OTHER PUBLICATIONS

Response (File Date Mar. 3, 2010) to Non-Final Office Action (Mail Date Dec. 8, 2009) for U.S. Appl. No. 12/058,786—Filing Date Mar. 31, 2008; Confirmation No. 3883.

Non-Final Office Action (Mail Date Jun. 1, 2010) for U.S. Appl. No. 12/058,786—Filing Date Mar. 31, 2008; Confirmation No. 3883.

Response (File Date Aug. 30, 2010) to Non-Final Office Action (Mail Date Jun. 1, 2010) for U.S. Appl. No. 12/058,786—Filing Date Mar. 31, 2008; Confirmation No. 3883.

Final Office Action (Mail Date Dec. 9, 2010) for U.S. Appl. No. 12/058,786—Filing Date Mar. 31, 2008; Confirmation No. 3883.

Response (File Date Feb. 7, 2011) to Final Office Action (Mail Date Dec. 9, 2010) for U.S. Appl. No. 12/058,786—Filing Date Mar. 31, 2008; Confirmation No. 3883.

Advisory Action (Mail Date Feb. 24, 2011) for U.S. Appl. No. 12/058,786—Filing Date Mar. 31, 2008; Confirmation No. 3883.

Appeal Brief (File Date Apr. 25, 2011) for U.S. Appl. No. 12/058,786—Filing Date Mar. 31, 2008; Confirmation No. 3883.

Non-Final Office Action (Mail Date Jul. 19, 2011) for U.S. Appl. No. 12/058,786—Filing Date Mar. 31, 2008; Confirmation No. 3883.

Non-Final Office Action (Mail Date Nov. 24, 2009) for U.S. Appl. No. 12/057,486—Filing Date Mar. 28, 2008; Confirmation No. 1440.

Response (File Date Feb. 24, 2010) to Non-Final Office Action (Mail Date Nov. 24, 2009) for U.S. Appl. No. 12/057,486—Filing Date Mar. 28, 2008; Confirmation No. 1440.

Non-Final Office Action (Mail Date May 25, 2010) for U.S. Appl. No. 12/057,486—Filing Date Mar. 28, 2008; Confirmation No. 1440.

Response (File Date Aug. 23, 2010) to Non-Final Office Action (Mail Date May 25, 2010) for U.S. Appl. No. 12/057,486—Filing Date Mar. 28, 2008; Confirmation No. 1440.

Non-Final Office Action (Mail Date Nov. 9, 2010) for U.S. Appl. No. 12/057,486—Filing Mar. 28, 2008; Confirmation No. 1440.

Response (File Date Jan. 10, 2011) to Non-Final Office Action (Mail Date Nov. 9, 2010) for U.S. Appl. No. 12/057,486—Filing Date Mar. 28, 2008; Confirmation No. 1440.

Final Office Action (Mail Date Mar. 18, 2011) for U.S. Appl. No. 12/057,486—Filing Date Mar. 28, 2008; Confirmation No. 1440.

Notice of Allowance (Mail Date Nov. 18, 2011) for U.S. Appl. No. 12/057,486—Filing Date Mar. 28, 2008; Confirmation No. 1440.

* cited by examiner

MODIFICATION OF A SWITCHING TABLE OF AN INTERNET PROTOCOL SWITCH

FIELD OF THE INVENTION

The present invention relates to a method, a system and computer program for populating an archive of stored IP addresses in an Internet traffic routing device.

BACKGROUND OF THE INVENTION

The Internet is made of a combination of physical networks connected together by internetworking devices such as routers and gateways. Recent years have seen a vast increase in the variety and amount of content accessible on the Internet. However, as the traffic and file sizes downloaded from the Internet grow, the protocols underlying the operation of the Internet are becoming increasingly limiting. Referring to FIG. 1, let the Internet 1 comprise routers $R_1$, $R_2$, $R_3$ and $R_4$ connected by transmission lines $L_1$, $L_2$, $L_3$, $L_4$ and $L_5$. Let individual computers (hosts) $D_1$ and $D_2$ be connected to the Internet 1 through routers $R_1$ and $R_4$ respectively. Similarly, let a local area network (LAN) 2 comprise hosts $D_3$ to $D_6$ connected to a LAN switch S, which in turn is connected to the Internet through router $R_2$.

Each host and router on a network is recognized by its logical address (e.g. an IP address), which encodes its network number and host number. Logical addresses are Internet work addresses whose jurisdiction is universal. However, traffic must pass through physical networks to reach a host. At the physical level, hosts and routers are recognized by their physical addresses. A physical address is a local address whose jurisdiction is a local network. A physical address should be unique locally, but not necessarily universally. A physical address is usually (but not always) implemented in hardware. Examples of physical addresses are 48-bit MAC addresses (in Ethernet) which are imprinted on a network interface card (NIC) installed in a host or router.

In a typical scenario, a host generates a message (e.g. a request or response) for transmission on the Internet 1. The message is processed by a transport layer, which adds a header and passes the resulting packet to a network layer. The network layer adds its own header (including the logical addresses of the source and destination computers) to form a network layer packet (e.g. an IP packet). The packet is then sent to a data link layer, which adds its own header (comprising the physical addresses of the source and destination hosts) and checksum and passes the resulting frame to a physical layer at which point the host (e.g. D1) transmits the frame to the nearest router (e.g. R1).

On receipt of a frame, a router (e.g. $R_1$) strips the header and trailer from the frame and passes the packet located in the frame's payload to routing software. The routing software uses the packet header to choose an output line from the current router to forward the packet to nearest router (e.g. $R_2$, $R_3$). This process is continued so that the packet is progressively moved through the Internet to the required destination. However, sometimes a message is too large to be encapsulated within a frame, in which case, the message must be fragmented and each piece thereof transported separately to its destination. Similarly, difficulties in synchronizing the operations at different layers leads to problems with inter alia unicast flooding (i.e. useless network traffic) which degrades the network performance.

For an Internet-based business (e.g. low-price airlines), a failure of any part of its computer system, for even a short period of time, will have a significant detrimental effect on its sales. In view of this, redundancy is being increasingly used to improve the reliability of a network by minimizing the impact of network faults. This usually involves duplicating routers, switches, and links to ensure continuity of service even during failures.

Layer 2 resiliency is achieved by providing multiple paths between different destinations. However, such multiple paths are prone to broadcast storms. The spanning-tree protocol (STP) was developed to prevent broadcast storms by breaking loops and rebuilding links between switches. However, even with improvements in this algorithm, it can still take 1-2 seconds for a topology to be modified.

SUMMARY OF THE INVENTION

The present invention provides a method for modifying a switching table of an Internet Protocol (IP) switch, said method comprising:

providing the IP switch, wherein the IP switch comprises multiple ports, the switching table which comprises at least one entry, and a lifetime for each entry of the at least one entry, wherein the multiple ports comprise a plurality of access ports and a plurality of interswitch ports, wherein each access port is identified by a port identifier and is connected to a corresponding host in a Local Area Network (LAN), wherein the interswitch ports are configured to be statically connected to routers within the Internet to connect the routers together in connections that cannot be overwritten by a dynamic learning process, wherein each entry of the at least one entry comprises an IP address, a port identifier associated with the IP address and identifying a port of the multiple ports, and a routing protocol internal metric indicative of confidence in the entry, and wherein the IP switch does not comprise a Media Access Control (MAC) table that associates a MAC address of each host in the LAN with each host's associated port identifier;

receiving an incoming IP frame at a first access port of the plurality of access ports, after said receiving the incoming IP frame, said IP switch validating the received IP frame;

after said validating, said IP switch reading from the IP frame an IP source address consisting of an address of a source from which the IP frame originated; and after said reading the IP source address, said IP switch manipulating the switching table, wherein said manipulating the switching table comprises either:

creating in the switching table a new entry in which the IP address and the associated port identifier are respectively set equal to the IP source address and a port identifier of the first access port, respectively, resulting in the at least one entry being updated to include the new entry or changing an existing entry of the at least one entry in dependence on the IP source address and the first access port.

The present invention provides a computer program product comprising a storage medium having computer readable program code stored therein, said program code configured to be executed by a computer to cause the computer to perform a method for modifying a switching table of an Internet Protocol (IP) switch, wherein the IP switch comprises multiple ports, the switching table which comprises at least one entry, and a lifetime for each entry of the at least one entry, wherein the multiple ports comprise a plurality of access ports and a plurality of interswitch ports, wherein each access port is identified by a port identifier and is connected to a corresponding host in a Local Area Network (LAN), wherein the interswitch ports are configured to be statically connected to routers within the Internet to connect the routers together in connections that cannot be overwritten by a dynamic learning process, wherein each entry of the at least one entry comprises an IP address, a port identifier associated with the IP address and identifying a port of the multiple ports, and a routing protocol internal metric indicative of confidence in the entry, and wherein the IP switch does not comprise a Media Access Control (MAC) table that associates a MAC address of each host in the LAN with each host's associated port identifier, and wherein the method comprises:

receiving an incoming IP frame at a first access port of the plurality of access ports;

after said receiving the incoming IP frame, said IP switch validating the received IP frame;

after said validating, said IP switch reading from the IP frame an IP source address consisting of an address of a source from which the IP frame originated; and after said reading the IP source address, said IP switch manipulating the switching table, wherein said manipulating the switching table comprises either:

creating in the switching table a new entry in which the IP address and the associated port identifier are respectively set equal to the IP source address and a port identifier of the first access port, respectively, resulting in the at least one entry being updated to include the new entry or changing an existing entry of the at least one entry in dependence on the IP source address and the first access port.

The present invention provides a system comprising a computer configured to execute program code stored in a storage medium to perform a method for modifying a switching table of an Internet Protocol (IP) switch, wherein the IP switch comprises multiple ports, the switching table which comprises at least one entry, and a lifetime for each entry of the at least one entry, wherein the multiple ports comprise a plurality of access ports and a plurality of interswitch ports, wherein each access port is identified by a port identifier and is connected to a corresponding host in a Local Area Network (LAN), wherein the interswitch ports are configured to be statically connected to routers within the Internet to connect the routers together in connections that cannot be overwritten by a dynamic learning process, wherein each entry of the at least one entry comprises an IP address, a port identifier associated with the IP address and identifying a port of the multiple ports, and a routing protocol internal metric indicative of confidence in the entry, and wherein the IP switch does not comprise a Media Access Control (MAC) table that associates a MAC address of each host in the LAN with each host's associated port identifier, and wherein the method comprises:

receiving an incoming IP frame at a first access port of the plurality of access ports, after said receiving the incoming IP frame, said IP switch validating the received IP frame;

after said validating, said IP switch reading from the IP frame an IP source address consisting of an address of a source from which the IP frame originated; and after said reading the IP source address, said IP switch manipulating the switching table, wherein said manipulating the switching table comprises either:

creating in the switching table a new entry in which the IP address and the associated port identifier are respectively set equal to the IP source address and a port identifier of the first access port, respectively, resulting in the at least one entry being updated to include the new entry or changing an existing entry of the at least one entry in dependence on the IP source address and the first access port.

The present invention provides a method for populating a switching table of an Internet Protocol (IP) switch, said method comprising:

providing the IP switch, wherein the IP switch comprises multiple ports and the switching table which is configured to comprise at least one entry, wherein the multiple ports comprise a plurality of access ports and a plurality of interswitch ports, wherein each access port is identified by a port identifier and is connected to a corresponding host in a Local Area Network (LAN), wherein the interswitch ports are configured to be statically connected to routers within the Internet to connect the routers together in connections that cannot be overwritten by a dynamic learning process, wherein each entry of the at least one entry comprises an IP address, a port identifier associated with the IP address and identifying a port of the multiple ports, and a routing protocol internal metric indicative of confidence in the entry, and wherein the IP switch does not comprise a Media Access Control (MAC) table that associates a MAC address of each host in the LAN with each host's associated port identifier;

said IP switch receiving, from a requesting host of the LAN at the access port connected to the requesting host, a dynamic host configuration protocol (DHCP) option 43 request comprising a host name of the requesting host;

said IP switch transmitting the received request to a DHCP server;

said IP switch intercepting a DHCP response from the DHCP server for the request;

said IP switch extracting an IP address from the intercepted DHCP response, wherein the extracted IP address is linked with the host name of the requesting host; and said IP switch adding the extracted IP address to a corresponding entry of the switching table that is specific to the access port connected to the requesting host.

DETAILED DESCRIPTION OF THE INVENTION

The data carrier will henceforth be known as an IP Frame. Similarly, the Internet traffic routing device will be known as an IP switch.

A. Ethernet Protocol

Figure 2:
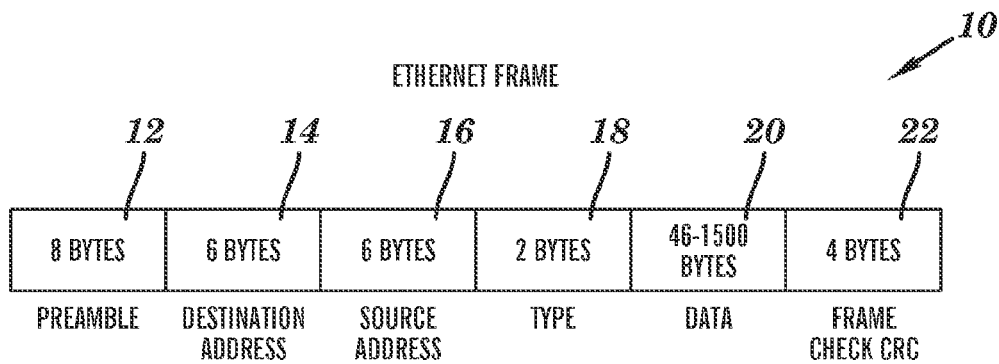
FIG. 2 is a block diagram of a conventional Ethernet frame.

Referring to FIG. 2, an Ethernet frame 10 comprises an eight byte preamble 12 (used to identify the start of a frame) and two Medium Access Channel (MAC) addresses 14, 16, the first of which specifies the address of the destination of the frame (i.e. the destination address 14) and the second specifies the address of the source of the frame (i.e. the source address 16).

Following the destination and source addresses 14, 16, the frame 10 comprises a frame type identifier 18 and a payload within a data field 20. The data field 20 is of 46 to 1500 bytes long. The upper limit of 1500 bytes is based on the physical limitations of cables available when the Ethernet protocol was first developed. However, subsequent developments in cabling technologies mean that this limitation no longer applies. Nonetheless, the Ethernet protocol has not kept up with these developments. The data field 20 is followed by a four byte cyclic redundancy check (CRC) field 22, which is used to detect errors in the frame 10.

B. Internet Protocol

Figure 3A:
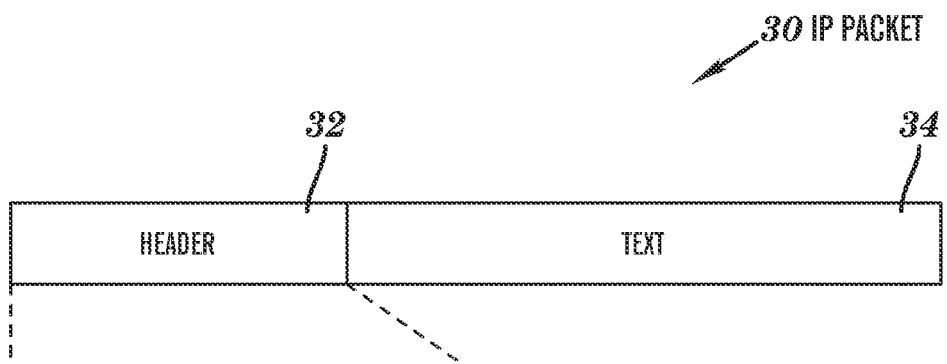
FIG. 3A is a block diagram of a conventional IP packet.
Figure 3B:
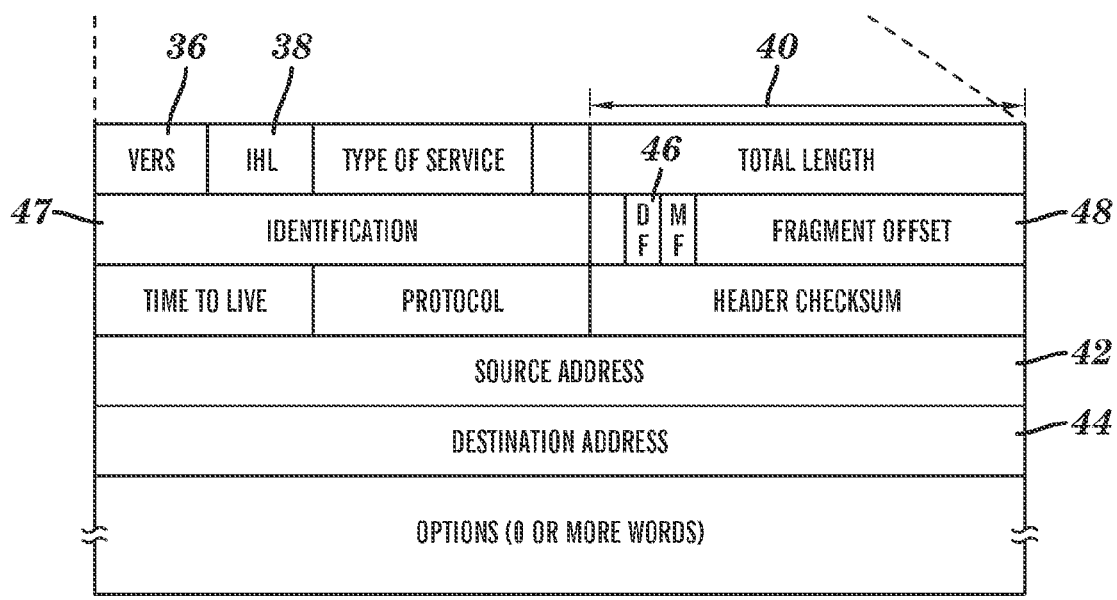
FIG. 3B is a block diagram of a header in a conventional IP packet of FIG. 3A.

The Internet protocol is a network layer protocol in which data is transmitted in the form of packets. Referring to FIG. 3A, an IP packet 30 comprises a header portion 32 (of variable length between 20-24 octets) and a text portion 34, which contains the data payload. Referring to FIG. 3B, the header portion 32 comprises fields: version 36, Internet Header Length (IHL) 38, and field 40 which specifies type of service and total length of the packet. The header portion 32 specifies inter alia the IP address of the source of the IP packet 30 (i.e. an IP source address 42) and the IP address of the intended destination of the IP packet 30 (i.e. an IP destination address 44).

An IP address encodes the network number and host number of every host and router on the Internet. An IP address can be set statically or dynamically via the Dynamic Host Configuration Protocol (DHCP). To obtain an IP address by DHCP, a newly booted computer broadcasts a DHCP discover packet. If a DHCP server receives the DHCP discover packet, it will check in its DHCP database and assign an available IP address thereto. The DHCP server will then return the DHCP address to the MAC-address of the requesting computer.

While an IP packet can be up to 64 Kbytes long, the data field of an Ethernet frame is only 1500 bytes long. Thus, to transmit a large IP packet under the Ethernet protocol, it may be necessary to divide the IP packet into a plurality of fragments that are small enough to be transmitted within an Ethernet frame. On reaching a given destination, the fragments are re-assembled to form the original payload of the IP packet. To facilitate the fragmentation process, an IP packet header 32 comprises a Dont Fragment (DF) flag 46 (which indicates whether or not the packet 30 may be fragmented), a More Fragment (MF) flag, a fragment offset 48, and an identification field 47 which identifies fragments derived from the same IP packet.

C. Traffic Routing Devices

C.1 LAN Switch

Figure 4:
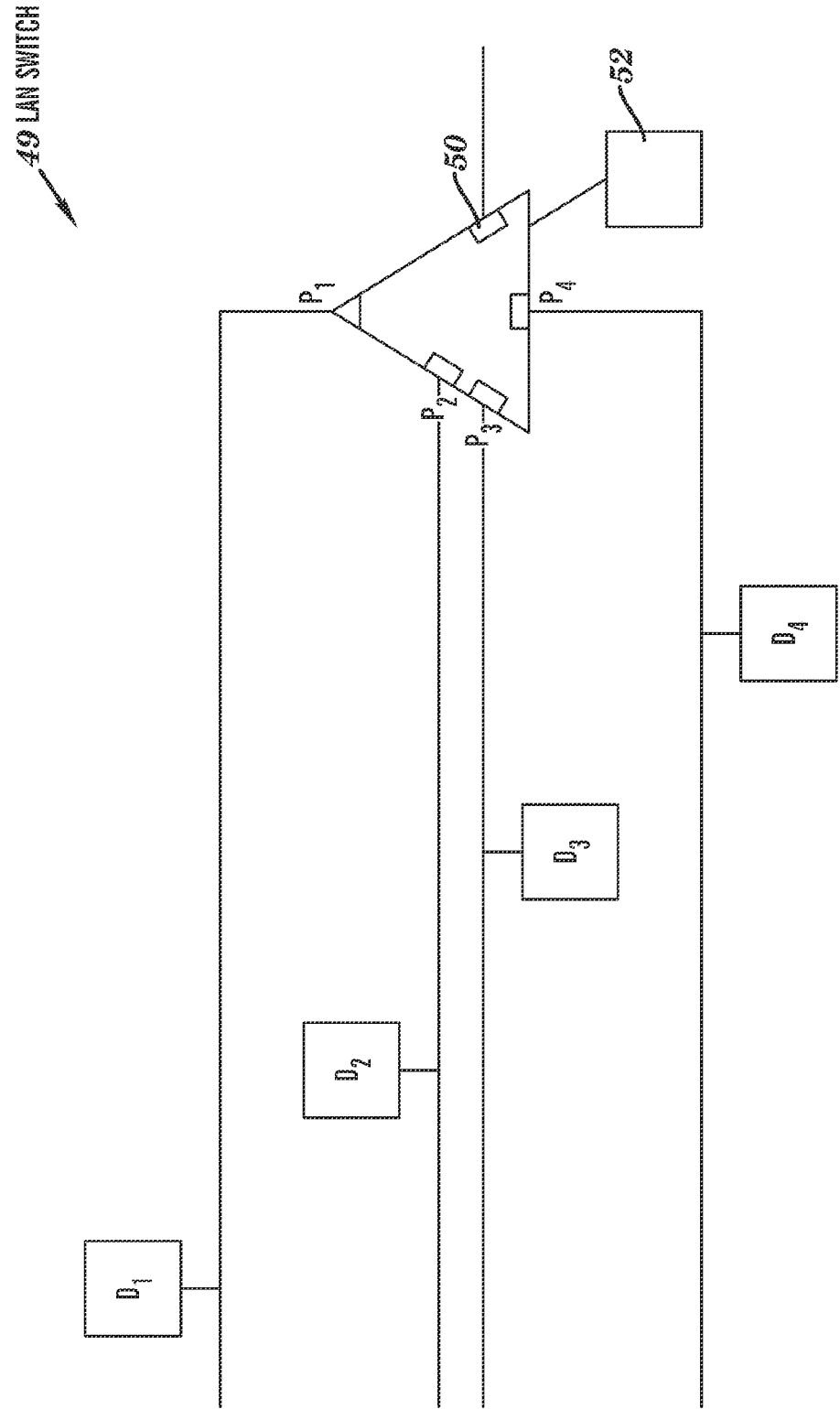
FIG. 4 is a block diagram of a conventional LAN switch.

Referring to FIG. 4, a LAN switch 49 comprises a plurality of ports $P_1$-$P_4$, each of which is connectable to a LAN segment and associated computers $D_1$-$D_4$. The LAN switch 49 further comprises a high speed port 50 which connects the LAN switch 49 to other computers in the network.

When a LAN switch 49 first starts up and the computers $D_1$-$D_4$ connected thereto request services from other computers, the switch 49 builds a table (known as MAC table) 51 that associates the MAC address of each local computer $D_1$-$D_4$ connected thereto, with the number of the port $P_1$-$P_4$ through which the computer is reachable. This ensures that if computer $D_1$ (connected to port $P_1$) needs to transmit to computer $D_2$ (connected to port $P_2$) the LAN switch 49 forwards the frames directly to the relevant ports (i.e. from port $P_1$ to port $P_2$), thereby sparing computers $D_3$, $D_4$ connected to the other ports ($P_3$, $P_4$) from having to respond to the frames intended for the computer $D_2$. Similarly, if computer $D_3$ needs to send data to computer $D_4$ at the same time that computers $D_1$ and $D_2$ are communicating, the LAN switch 49 will forward frames from port $P_3$ to port $P_4$ at the same time as it forwards frames from port $P_1$ to port $P_2$.

A switch directs a frame to an appropriate port by:

(a) determining the destination MAC address of the frame;

(b) comparing the destination MAC address with the addresses listed in the MAC table;

(c) finding a port number that corresponds with the destination MAC address; and (d) transmitting the frame through the relevant port.

If a LAN switch 49 receives a frame comprising a destination MAC address that is not listed in the switch's MAC table 52, the LAN switch 49 sends the (unicast) frame out through all of its ports (excluding the port from the frame originated) in a technique known as unicast flooding. On receipt of the packet, the destination host transmits an acknowledgement packet to the switch. The switch then adds the relevant MAC address (from the acknowledgement packet) to its MAC table 52.

The LAN switch's MAC table 52 is populated statically or by a dynamic learning process. In the dynamic learning process, the LAN switch 49 compares an incoming frame's source address with the MAC addresses stored in the switch's MAC table 52. If the source MAC address is not listed in the switch's MAC table 52, the port number from which the frame was received and the frame's source MAC address are added to the MAC table 52. The dynamic learning process may be conducted every time a frame is received, so that a movement of a computer to another port is automatically detected and the switch's MAC table 52 reconfigured accordingly. It is also possible to specify a lifetime for an entry in the switch's MAC table 52, wherein after the expiry of the lifetime, the entry is removed from the switch's MAC table 52 and must be relearned.

C.2 IP Router

IP routers also direct Internet traffic. On receipt of an incoming frame, an IP router strips off the frame's header and examines the remaining IP packet to determine its IP destination address. This information is used together with optimal route details stored in a routing table in the router to determine the output line on which to transmit the packet.

Routing protocols (e.g. OSPF (Open Shortest Path First) and RIP (Routing Information Protocol)) enable routers to advertise and learn the most efficient routes to a given destination, to allow the routers to dynamically build and populate their routing tables. OSPF operates by assigning a cost (e.g. distance, delay etc.) to each path in a network and using these costs to compute the shortest path between a router and other nearby routers. OSPF also exchanges routing information between adjacent routers. In use, a router floods a "hello" message through all of its ports to identify its neighbors and then establishes a neighbourhood with adjacent routers and exchanges costs and tables therewith.

C.3 Default Gateway

Returning to FIG. 1, a default gateway is usually a router ($R_2$) that enables an end-host (e.g. $D_3$) to forward IP packets to the outside world (outside its LAN 2). From the above discussions of the Internet Protocol and Ethernet Protocol, it can be seen that even if the IP address of the default-gateway ($R_2$) is configured on all of its hosts ($D_3$-$D_6$), the end-hosts ($D_3$-$D_6$) use the Address Resolution Protocol (ARP) to determine the MAC address corresponding to the default gateway's IP address and encapsulate IP packets in Ethernet frames comprising the default-gateway MAC-address.

C.4 Address Resolution Protocol (ARP)

Physical and logical addresses are two different identifiers which are needed because an IP packet at the network layer may pass through different physical networks to reach its destination. As a result, it is necessary to be able to map a logical address to its corresponding physical address and vice versa. This can be done by either static or dynamic mapping. Static mapping means creating a table that associates a logical address with a physical address. This table is stored by each machine on a network. However, this approach is not ideal because physical addresses may change (e.g. if a host changes its NIC, or a mobile computer moves from one physical network to another). To implement these changes, a static mapping would have to be updated regularly, which would reduce network performance.

In dynamic mapping each time a machine knows one of the two addresses (logical or physical), it can use a protocol (e.g. Address Resolution Protocol (ARP)) to find the other one. When a host has a packet bound for another host on a locally connected Ethernet network (or a router receives a packet addressed to the local IP subnet), it will send a broadcast Ethernet frame containing an ARP request onto the Ethernet. An ARP request comprises the physical and logical addresses of the sender host and the logical address of the target (destination) host. All hosts with the same Ethernet broadcast address will receive the ARP request packet and examine it to compare the IP address it contains with the host's own IP address. If there is a match, the host will issue an ARP reply to the sender's MAC address and insert its own MAC address as the source of the reply. The sender host (or router) can then resolve the MAC-to-IP addressing and can send the original packet to the destination host using the destination host's proper MAC address.

If this process was to be repeated every time a packet was received from an external source, a LAN would be flooded with ARP broadcasts and replies. To avoid this situation, each host creates an ARP cache that monitors ARP requests and replies and builds a table of MAC and corresponding IP addresses. Because a host's IP address may change, either through manual configuration or automatic IP assignment (e.g. DHCP), the ARP cache must deactivate entries in the cache, typically every 4 hours (according to an ARP entry idle timeout variable) after creation.

Returning to FIG. 1, let a host $D_2$ (which may or may not be part of a LAN) attempt to send a data packet to host $D_6$ in LAN 2. In this case, host $D_2$ must first send the data packet to router $R_4$ which transmits the packet to router $R_2$ through the Internet 1. On receipt of the packet, the router $R_2$ uses its ARP table (not shown) to identify the correct MAC address of the recipient host $D_6$. On determining the correct MAC address, the router $R_2$ transmits the packet to the switch S. The switch S then compares the MAC address of the desired recipient host $D_6$ with entries in its MAC table (not shown) to determine the correct port from which to transmit the packet so that it reaches the host $D_6$.

As mentioned above, individual entries in a switch's MAC table and a router's ARP table have predefined timeout values (after which the entry must be relearned). An ARP table entry typically has a timeout value of about 4 hours (240 minutes), whereas a MAC table entry typically has a timeout value of about 5 minutes. Thus, the dynamic learning procedures employed in MAC and ARP tables are unlikely to be synchronized between routers and switches. Accordingly, there may be mismatches between the entries in each table.

In particular, if the router $R_2$ was unable to find a matching MAC address to the IP destination address of the packet from $D_2$, the router $R_2$ would broadcast an ARP request packet to the switch S. On receipt of the ARP request packet, the switch S would broadcast the request through all of its ports and to all ports of any other switches. However, such flooding disturbs the performance of the network. To overcome this problem, synchronization of the ARP and MAC tables is needed.

D. Improved Frame Format

Figure 5:
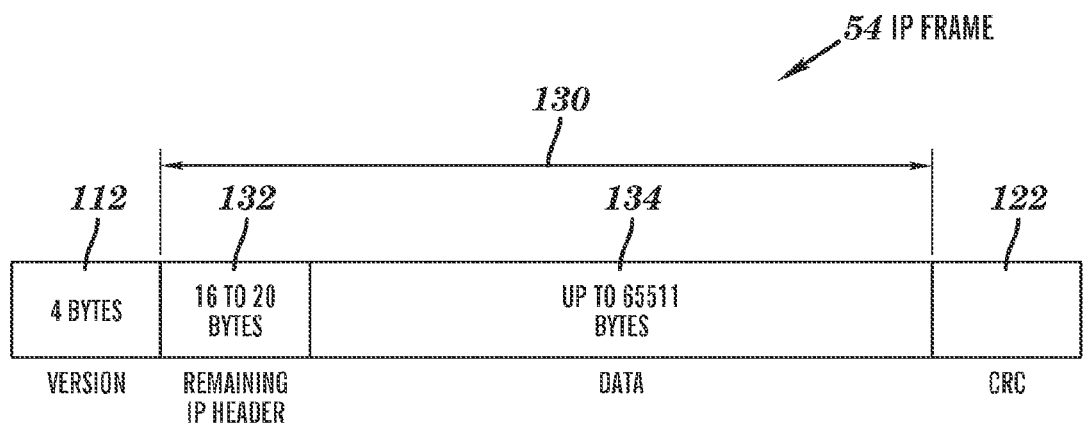
FIG. 5 is a block diagram of an IP frame, in accordance with embodiments of the present invention.

Referring to FIG. 5, an IP frame 54 comprises a four byte preamble field 112 (which is used to identify the start of the frame), in accordance with embodiments of the present invention. The IP frame 54 further comprises an IP packet 130 with its associated IP header 132 (and IP source and destination addresses (not shown)) and IP text section 134. Following the IP packet 130, the IP frame 54 comprises a CRC checksum field 122.

However, the IP frame 54 does not include the MAC source and destination addresses of a traditional Ethernet frame (as shown in FIG. 2). Nor, does the IP frame 54 include the frame type identifier field of a traditional Ethernet frame. These omissions reduce the size of an IP frame 54 by fourteen bits, but more importantly ensure that the frame's payload is no longer subject to the 1500 byte limit normally provided under the Ethernet protocol. Accordingly, an IP packet can be encapsulated in its entirety within the IP frame 54 and transmitted without fragmentation and re-assembly.

Figure 6:
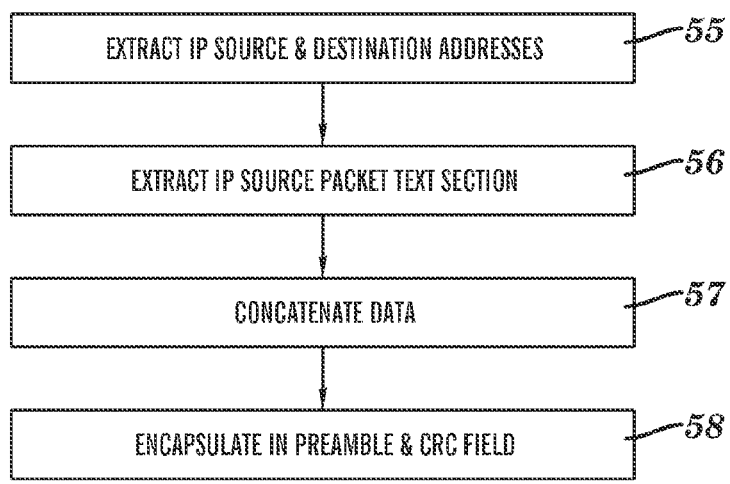
FIG. 6 is a flowchart of the processing of an IP packet to produce the IP frame shown in FIG. 5, in accordance with embodiments of the present invention.

Referring to FIG. 6, an IP frame is formed from an IP packet by the following steps:

(a) extracting (step 55) the IP source and IP destination addresses from the IP packet;

(b) extracting (step 56) the text section from the IP packet;

(c) concatenating (step 57) the IP source and destination addresses and the text section to produce concatenated IP data; and (d) encapsulating (step 58) the concatenated IP data between the preamble field and the CRC checksum field.

E. IP Switch

Since the IP frame does not comprise a MAC source and destination address, it can no longer be processed by a conventional LAN switch (in accordance with the data link layer). Instead, the IP frame is transported to its correct recipient by a routing device, namely an IP switch 60. In effect, the IP switch 60 (see FIG. 7) forwards IP packets based on their IP destination address, so that the MAC address table of a prior art LAN switch is no longer needed. Since a MAC source address, a MAC destination address, and a frame type identifier does not exist in the IP frame 54, the IP switch 60 is not configured to process a MAC source address, a MAC destination address, and a frame type identifier.

Figure 1:
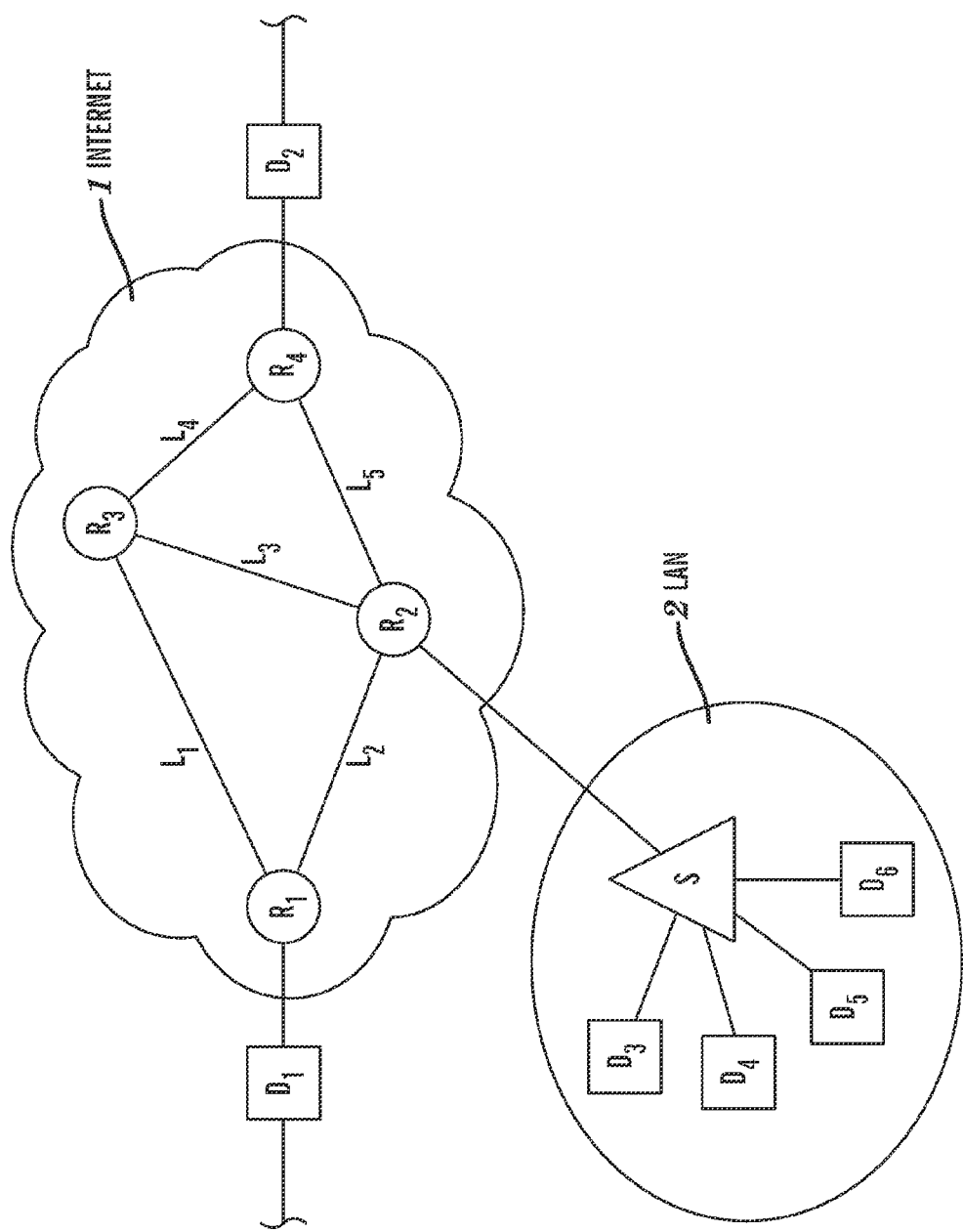
FIG. 1 is a block diagram of computers connected to the Internet.
Figure 7:
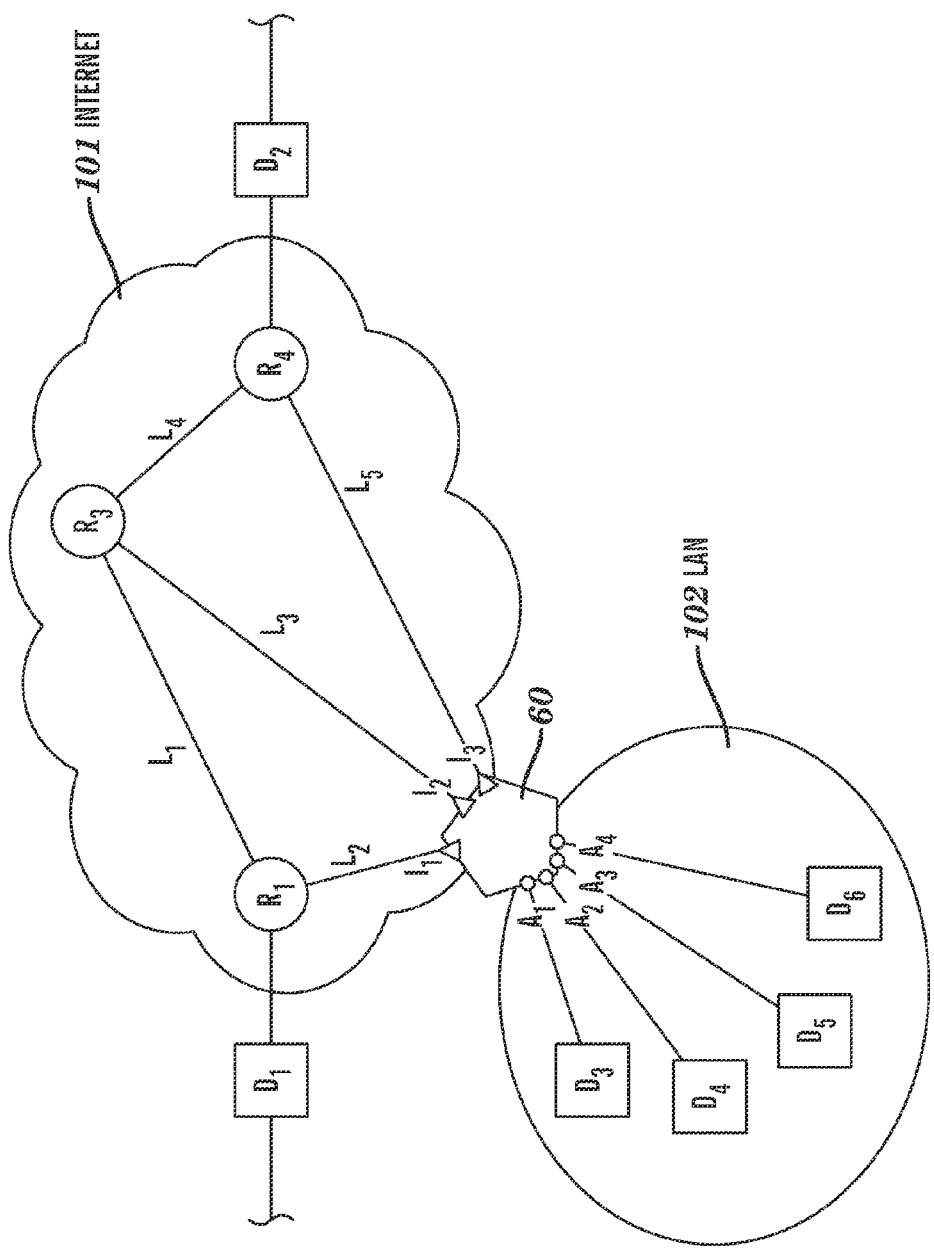
FIG. 7 is a block diagram of computers connected to the Internet through the IP switch in accordance with embodiments of the present invention.

Comparing FIG. 1 with FIG. 7, it can be seen that the LAN switch S of FIG. 1 is removed from a LAN 102 and replaced with an IP switch 60 to which the hosts $D_3$-$D_6$ are directly connected. Similarly, the IP switch 60 is connected to other conventional routers or other IP switches. Thus, the IP switch 60 becomes a default gateway for the LAN 102. The IP switch's ports are divided into interswitch (or transport ports) ($I_1$-$I_3$) and IP access ports ($A_1$-$A_4$). Interswitch ports ($I_1$-$I_3$) are statically configured to connect routers together wherein these connections cannot be overwritten by a dynamic learning procedure. In contrast, routes through IP access ports ($A_1$-$A_4$) are dynamically learned and can be overwritten depending on changing conditions in the network. In FIG. 7, the Internet 101 comprises routers $R_1$, $R_3$, and $R_4$, which are connected to each other, to Interswitch ports $I_1$, $I_3$, and $I_4$, respectively, and to the IP switch 60 by trasnmission lines $L_1$, $L_2$, $L_3$, $L_4$, and $L_5$ in the manner shown. In addition, routers $R_1$ and $R_4$, are connected to hosts $D_1$ and $D_2$, respectively.

By removing the layer 2 link between the hosts $D_3$-$D_6$ and the router $R_2$; and replacing it with a single link between each host and the IP switch 60, the separate ARP and MAC tables of the prior art LAN switch and IP router are replaced by a single IP switching table in the IP switch 60, thereby avoiding the prior art problem of synchronizing ARP and MAC tables. Similarly, layer 2 loops and unicast flooding are avoided, as are, problems with fragmentation and address resolution.

Figure 8:
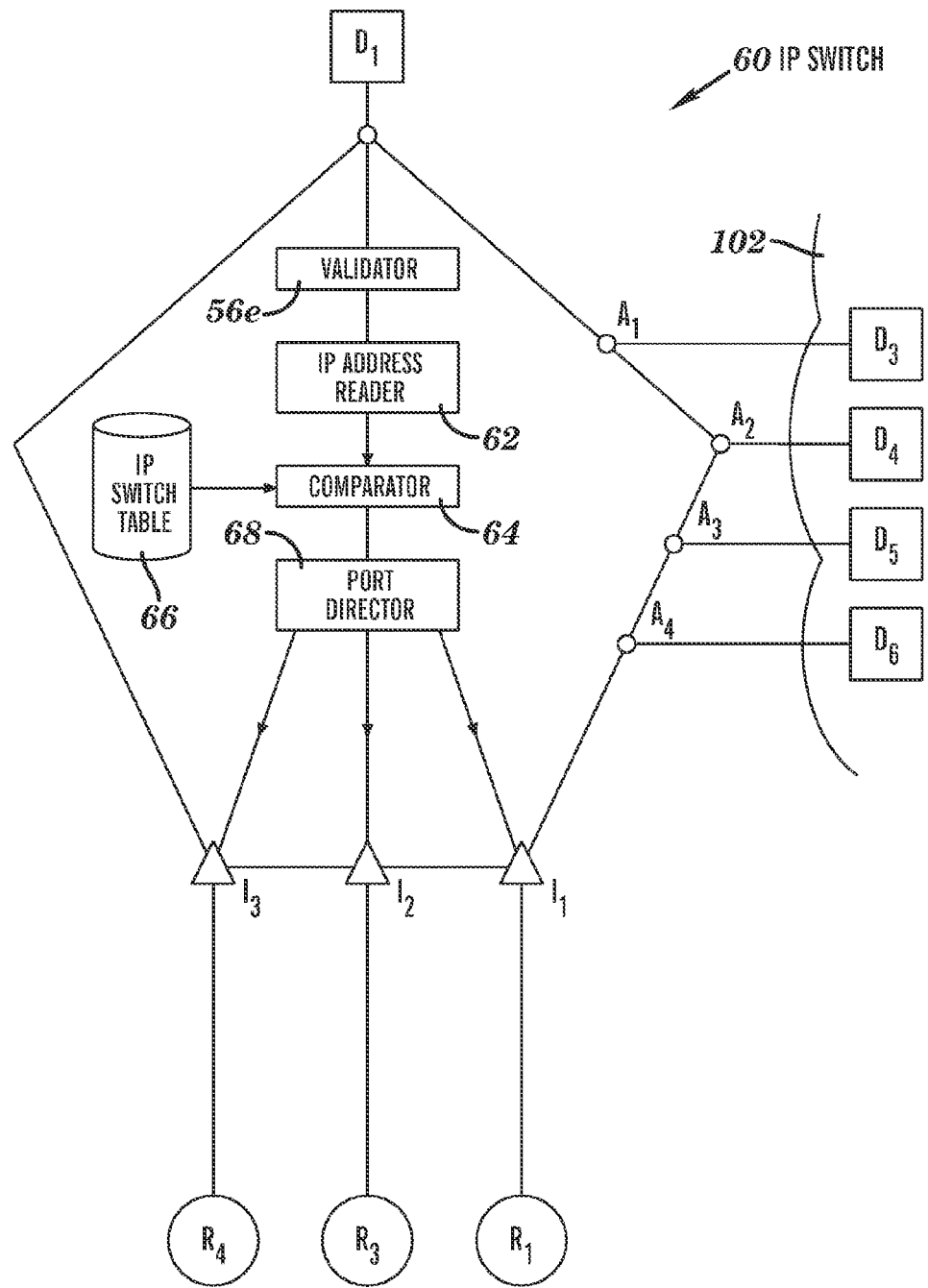
FIG. 8 is a more detailed block diagram of the IP switch shown in FIG. 7, in accordance with embodiments of the present invention.

Referring to FIG. 8, the IP switch 60 comprises a validator 56e for validating an incoming IP frame, an IP address reader 62 which reads the IP destination address of the incoming IP frame, and a comparator 64 which compares the IP destination address with the IP addresses in an archive, namely the IP switching table 66. The IP switch 60 further comprises a port director 68 which directs an IP frame to a port (i.e., to an interswitch port or to an access port) whose port number corresponds with the matching entry in the IP switching table 66.

F. Dynamic Learning Procedures in the IP Switch

The IP switching table in the IP switch 60 is populated with host IP addresses for each interface thereto, by means of:

(a) DHCP snooping (using DHCP Option 43 and well known Multicast IP@ by intercepting and interpreting DHCP server replies sent back to a host after the host has requested its IP address with a DHCP request; and (b) a dynamic IP Learning procedure performed only on the IP switch's access port(s).

In broad overview, when an IP switch 60 dynamically discovers (via DHCP snooping or IP source address checking) that a new IP device is directly connected thereto, it adds an IP route entry to its IP switching table and advertises (using IP routing protocols such as OSPF) the new entry to its IP peers. The new entry has a lifetime and can be suppressed immediately when a link goes down or when a DHCP response is intercepted by the IP switch 60. Regardless of whether it is learned by the dynamic learning procedure or the DHCP snooping procedure, an entry in the IP switching table will have an administrative distance of 0 (to represent a directly connected physical link). A more detailed discussion of the dynamic IP learning procedure and the DHCP snooping procedure follows below.

F.1 Dynamic IP Learning Procedure

Figure 9:
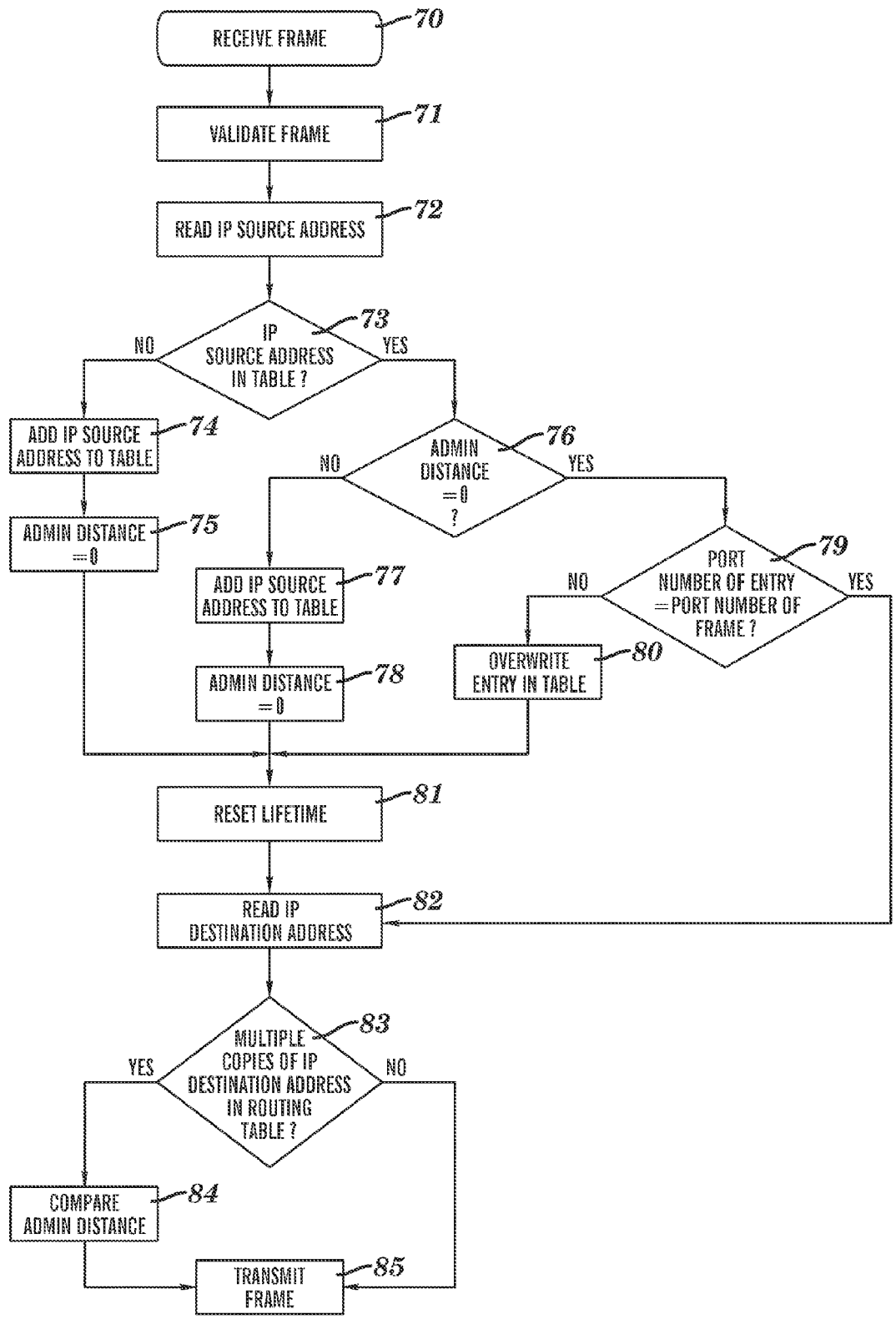
FIG. 9 is a flowchart of the dynamic learning procedure employed in an access port of the IP switch shown in FIG. 7, in accordance with embodiments of the present invention.

Referring to FIG. 9, on receipt (step 70) from a host of an incoming IP frame on an access port, the IP switch validates (step 71) the CRC of the IP frame. Following validation, the IP switch reads (step 72) the IP source address from the IP frame. The IP switch then checks (step 73) whether the IP source address is present in its IP switching table.

If the IP source address of the IP frame is not present in the IP switching table, the IP source address (with subnet mask/32 to provide a route to a single host) is added (step 74) to the IP switching table, together with the number of the port on which the IP frame was received. The /32 subnet mask is included with the IP source address to ensure that the IP address only relates to the specifically identified host and not any other hosts. In particular, the couple (IP address, /32 subnet mask) is an IP subnet containing a single IP address. The administrative distance of the new entry is then set (step 75) to zero (or to a pre-defined administrative distance threshold such as zero).

However, if the IP source address of the IP frame is present in the IP switching table, the administration distance of the entry in the IP switching table is checked 76. If the administration distance of the entry is not equal to zero (i.e. the entry does not represent a directly connected route) or above a pre-defined administrative distance threshold (e.g., zero), then the IP source address of the IP frame is added (step 77) to the IP switching table (to maintain redundancy in the table) together with the subnet mask/32 and the number of the port on which the IP frame was received. The administration distance of the new entry is set (step 78) to zero (or to a pre-defined administrative distance threshold such as zero).

If the IP source address of the incoming IP frame has a matching counterpart in the IP switching table and the administration distance is equal to zero (i.e. is the result of a static configuration) the port number of the entry is compared (step 79) with that of the port on which the IP frame was received.

If the port number of the entry in the switching table matches that of the port on which the IP frame was received, then step 82 is next executed.

If the port number of the entry in the switching table does not match that of the port on which the IP frame was received, it means that the source device was moved to another port. Accordingly, the entry in the IP switching table is overwritten (step 80) with the details of the incoming IP frame and port on which it was received.

The lifetime of the relevant entry in the IP switch is then reset (step 81). Thus, the entries in the IP switching table comprise the following variables: IP subnet (subnet address, subnet mask), [administrative distance/other routing protocol internal metric indicative of confidence in the entry], next hop (when possible), next interface. The administrative distance is indicative of a confidence in the entry's routing protocol for routing an IP frame from the port identified by the port identifier to the IP address of each entry. The confidence for the entry increases with decreasing administrative distance. An administrative distance of zero ("0") is a smallest possible administrative distance and denotes a directly connected physical link. For example, the IP switching table could include the following entries:

172.17.0.0/16 is variably subnetted, 2 subnets, 2 masks

O IA 172.17.0.0/16 [110/11] via 9.100.112.132, 16:53:03, FastEthernet0/0

O IA 172.16.0.0/16 [110/2] via 9.100.112.134, 16:53:03, FastEthernet0/0

172.19.0.0/32 is subnetted, 2 subnets
O E2 172.19.147.138 [110/20] via 9.100.112.130, 16:53:03, FastEthernet0/0
O E2 172.19.147.134 [110/20] via 9.100.112.130, 16:53:03, FastEthernet0/0

In use, the IP destination address is then read (step 82) from the IP frame and compared (step 83) with those in the IP switching table. If multiple copies of the IP destination address are found in the IP switching table, the administration distances of the entries are compared (step 84) and the entry with the lowest administration distance is used to determine the number of the port from which to transmit the IP frame. The IP frame is then transmitted (step 85) from the relevant port of the modified IP switch. Similarly, if there is only one copy of the IP destination address in the IP switching table, the IP frame is transmitted (step 85) from the port corresponding thereto.

F.2. DHCP OPTION 43 Dynamic Learning Procedure

DHCP option 43 is a field in which an end-host can put an identifier in a DHCP request. At present a DHCP server checks the source MAC address of a DHCP request. However, with the IP switch, MAC addresses are not used any longer. Thus, it is necessary to use another identifier to enable a DHCP server to determine if a host is authorized to acquire an IP address therefrom (by means of a HTTP request). In particular, DHCP option 43 is used with a host identifier instead of a traditional source MAC address to identify the originator of a DHCP request and determine whether or not the originator is entitled to acquire an IP address therefrom. For example, the host name could be used as a host identifier.

EXAMPLE

Option 43:
Parameter hostname: PC0012.officesite.country.companyname.com

As a result, the DHCP server will link the IP address it assigned with the hostname it received in the DHCP request.

In general, the main purposes of using option 43 in the DHCP request is to authenticate, validate, and account the DHCP client as described above; and to provide an IP address from an appropriate pool, range, or IP subnet. For example, if an option 43 DHCP request comprising the identifier hostname=pc.engineeringstaff.lab.ibm.com is received by a DHCP server, on detecting the option 43 value, the DHCP server could decide to offer an IP address in the subnet 12.12.12.0/24 because it has determined that this host relates to a member of the engineering staff.

Figure 10:
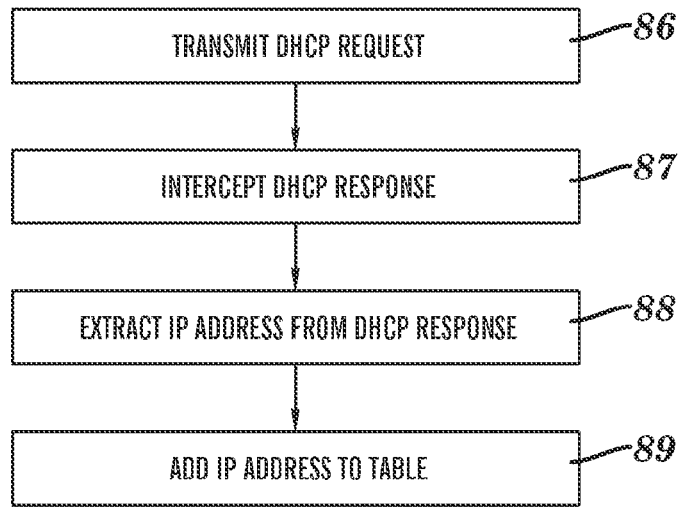
FIG. 10 is a flowchart of the DHCP option 43 snooping procedure employed in an access port of the IP switch shown in FIG. 7, in accordance with embodiments of the present invention

Referring to FIG. 10, in broad overview, the method of populating the IP switching table of the IP switch using the DHCP option 43 dynamic learning procedure comprises the steps of:

transmitting (step 86) a DHCP option 43 request to a DHCP server;

intercepting (step 87) the DHCP response from the DHCP server;

extracting (step 88) the IP address from the DHCP response; and adding (step 89) the IP address to the IP switching table.

G. Transmission from Interswitch Ports in the IP Switch

Figure 11:
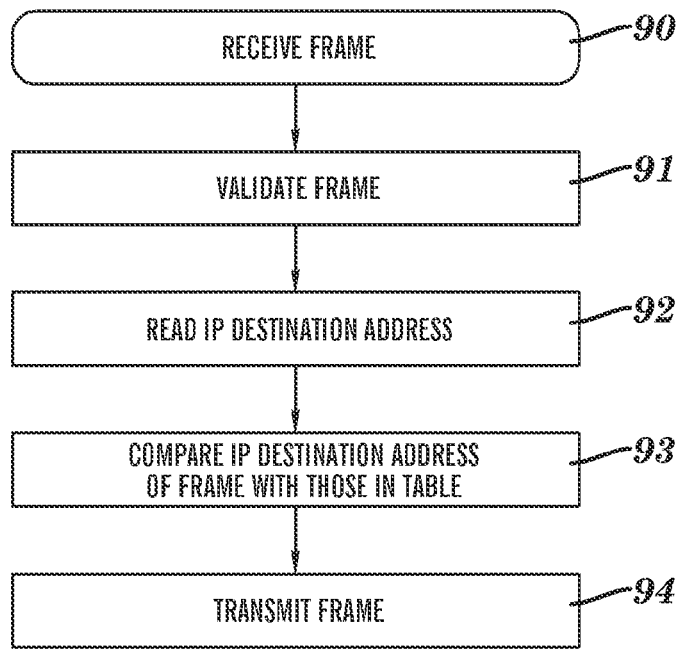
FIG. 11 is a flowchart of the operation of a transport port in the IP switch shown in FIG. 7, in accordance with embodiments of the present invention.

Interswitch ports are statically configured and do not undergo the above-described dynamic learning process. Accordingly, referring to FIG. 11, on receipt (step 90) from a router of an incoming IP frame on an interswitch port, the frame is validated (step 91) by means of its CRC. The IP destination address is then read (step 92) from the IP frame and compared (step 93) with the IP destination addresses (and associated subnet masks) in the IP switching table, to find the closest matching entry. The IP frame is then transmitted (step 94) from the port (i.e., from an access port or from an interswitch port) whose number is listed in the closest matching entry.

In summary, in contrast with the operations of a traditional LAN switch, the IP switch does not check for a protocol type of an incoming IP frame, nor does it check for the MAC addresses in the frame.

H. Applications of the IP Switch and IP Frame

H.1 Subnet Broadcast Addressing

Broadcast addressing refers to the ability to address a message that is broadcast to all hosts on a network. The destination address in a broadcast message consists of all ones (e.g. 0xFFFFFFFF). All stations automatically receive frames with this address. On IP networks, the IP address 255.255.255.255 is a general (or full) broadcast address. Packets with this address are in principle transmissible to all hosts on the Internet. However, it is also possible to broadcast a message to a smaller select group of hosts that are connected to a same sub-network. For example, on a (class C) network with IP address 192.168.1.0 the last byte designates a host address. However, a zero in this host address position does not refer to any given host, but instead provides a way of referring to the entire sub-network. The broadcast address for a specific network includes all ones in the host portion of its IP address. Thus, in the present example, packets with the sub-network broadcast IP address 192.168.1.255 are sent to all hosts on the sub-network.

In the IP switch, since it is no longer necessary to broadcast MAC addresses (to implement ARP), full IP broadcast addressing is no longer needed, since the first IP switch for a sub-network will manage the traffic for the sub-network. Thus, only sub-network broadcast IP addressing is required with the IP switch and there is no way of adding a full IP broadcast address to the switching table of the IP switch.

If an IP packet is received (from a conventional IP router), with a full IP broadcast address (255.255.255.255) as its IP destination address, there are a number of options available to the IP switch. In particular, the IP switch could redirect the received packet to all of its ports or drop the packet. Neither of these options is desirable. The first option is not particularly efficient insofar as it merely contributes to the amount of broadcast traffic on the network. The second option is undesirable because of the loss of potentially important information. A more desirable solution is for the IP switch to convert the full IP broadcast address to a sub-network broadcast IP address and redirect the modified packet to all the interfaces to hosts on the same relevant IP sub-network.

Figure 12:
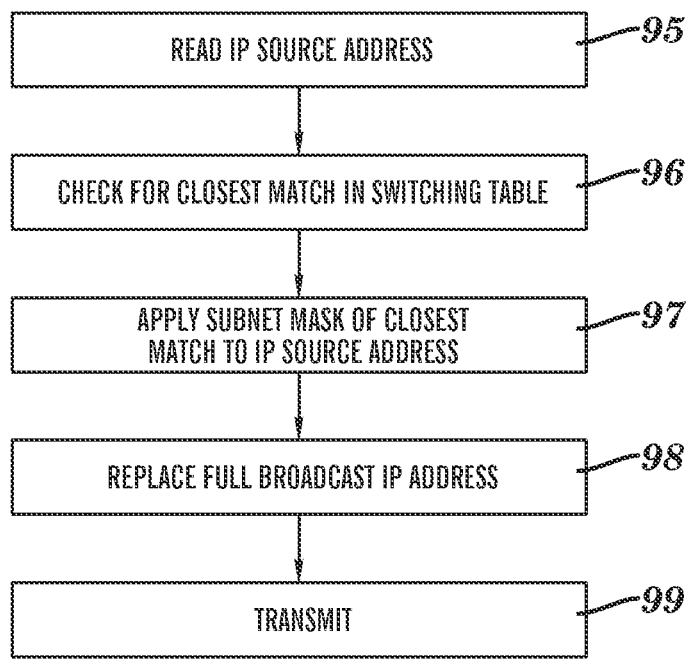
FIG. 12 is a flowchart of the conversion of a full IP broadcast packet into a IP sub-netted broadcast IP frame by the IP switch shown in FIG. 7, in accordance with embodiments of the present invention.

To this end, the IP switch could use a class-based subnetted broadcast of the IP address dynamically learned on the port where the broadcast had been received. For example, referring to FIG. 12, let a broadcast IP packet have an IP source address of 192.168.1.1 and a (full broadcast) IP destination address of 255.255.255.255. In the first steps, the IP switch reads (step 95) the IP source address of an IP frame and compares (step 96) it against the IP entries in its IP switching table. Let the IP switch have an IP route entry for the IP source address wherein the IP source address 192.168.1.1/32 is mapped to port 1. The IP source address belongs to class C, whose subnetmask is 255.255.255.0 (/24). Thus, the corresponding subnet broadcast address will be 192.168.1.255.

Accordingly, the IP switch applies (step 97) the subnet mask to yield 192.168.1.255 and replaces (step 98) the full IP source broadcast address with the subnetted IP source address and transmits (step 99) the IP packet on all of the ports whose IP route entry (in the IP switching table) matches with the IP subnet 192.168.1.0/24 address.

If the IP switching table of the IP switch is populated using the DHCP snooping procedure, the DHCP reply from a DHCP server contains a given IP address and subnet mask. Thus, the IP switch could store the IP subnet mask to enable the translation of a full broadcast received on the relevant port to a subnetted IP broadcast, wherein the IP subnet mask found in the DHCP reply could be used to calculate the appropriate subnetted broadcast IP address as discussed above.

H.2 Avoiding Fragmentation Problems with the IP Frame

H.2(a) L4/L7 Switching

An L4/L7 switch enables the development of advanced network architectures by allowing routing and switching to be conducted based on information related to an application, rather than network addresses. L4/L7 switches can read application-level information in packet headers or payloads to enable the switch to intelligently distribute requests to the most suitable application server, based on geographic location, latency, application or server load. To provide this functionality, an L4/L7 switch employs network address translation (NAT) and higher layer addressing.

H.2(b) Network Address Translation (NAT)

Figure 13:
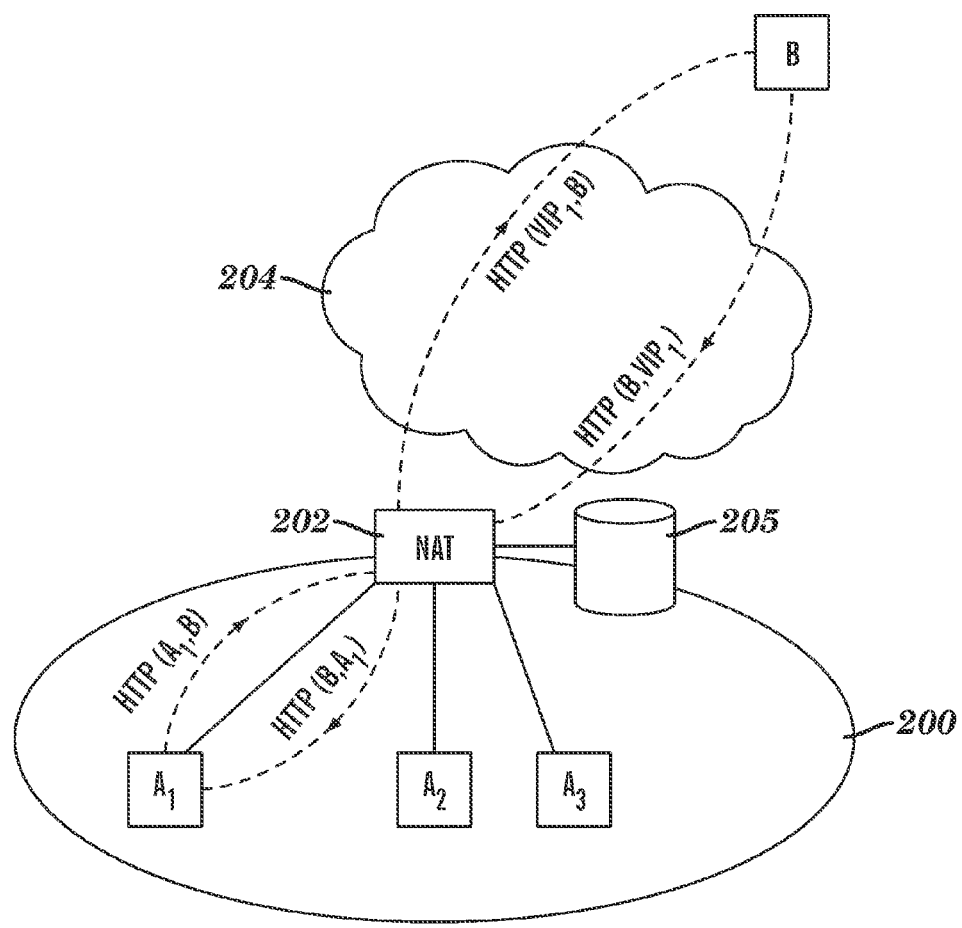
FIG. 13 is a block diagram of a conventional session through an L4/L7 switch.

NAT re-writes the source and/or destination addresses of IP packets as they pass through a router or firewall to enable multiple hosts on a private network to access the Internet using a single public IP address. Referring to FIG. 13, in a typical configuration, a local network 200 comprises a plurality of private hosts $A_1, A_2, A_3$, each of which has a private IP address. The private hosts $A_1$-$A_3$ are connected to a NAT device (i.e. a router) 202 which is connected in turn to the Internet 204.

Let an internal private host $A_1$ attempt to contact an external host B with a packet HTTP($A_1$, B). The NAT device 202 intercepts host A's outgoing packet and re-writes the source address ($A_1$) with a public virtual IP address ($VIP_1$) selected from a pool 205 of public addresses in the NAT device 202 and mapped as a temporary alias to the private host A's private IP address ($A_1$). The source address of the packet from host $A_1$ is re-written with the virtual IP address ($VIP_1$), to produce a new outgoing packet HTTP($VIP_1$, B) and a local session state is set up in the NAT device 202 for the mapping between the private and the virtual (public) addresses. After this mapping is made, all subsequent packets within this application stream, from this private IP address to the specified virtual address, will also have their source (private IP) address mapped to the virtual address in the same fashion.

On receipt of a response packet HTTP (B, $VIP_1$) from external host B, the NAT device 202 checks the destination address of the packet. If the destination address is stored in the NAT pool 205, the NAT device 202 looks up its translation table and if it finds a corresponding table entry, maps the destination address ($VIP_1$) to the appropriate local private IP address ($A_1$). However, if there is no current mapping entry for the destination address, the packet is discarded.

It can be seen from the above, that a NAT device usually alters the IP source address of a request packet and the IP destination address of a reply packet thereto. The resulting packet is then routed through the networks in the Internet to its required destination. However, as a packet is routed through different networks, it may be necessary for an intermediate router (i.e., a gateway between different types of networks) to divide the packet into smaller pieces. This process (known as fragmentation) occurs when a router receives a packet larger than the maximum transmission unit (MTU) (i.e., the largest packet transferable in a network) of the next network segment. For example, if an attempt is made to transfer a large video file (of more than 1500 bytes) through a LAN (operating under the Ethernet protocol), the packet must be fragmented so that the individual fragments can be encapsulated in Ethernet frames and transported through the LAN.

If the DF bit of an IP packet is set to zero, an intermediate router can fragment the IP packet and the resulting fragments are received by the destination host and reassembled therein. However, if the DF bit in the IP packet is set to one, the intermediate router is not allowed to fragment the IP packet. In this case, there are two available options. In the first option, the intermediate router over-rides the prohibition on fragmentation (provided by the setting of the DF bit to one) and forces the fragmentation of the IP packet. However, this option is only used if a network administrator is sure of the type of traffic passing through the network device because forcing fragmentation can have a detrimental effect on the Internet stream. Thus, whilst in practice, this course of action is not recommended, nonetheless if used, it would have the same result as if the DF bit had originally been set to zero.

The other possibility is not to force the DF bit. In this case, the intermediate router cannot fragment the IP packet. Thus, the intermediate router drops the IP packet and returns an Internet Control Message Protocol (ICMP) packet (i.e. a protocol used between a host server and a gateway to the internet to send message control and error-reporting messages) to the source of the original IP packet. The ICMP message indicates that the original IP packet needs to be fragmented at the source because the DF bit is set to 1 (i.e. the IP packet cannot be fragmented at the intermediate router). However, because of the address translation activities of the L4/L7 switch, the source address of the packet is a virtual IP address. An L4/L7 switch does not manage ICMP messages. Thus, when the ICMP message (from the intermediate router) is received by the L4/L7 switch, the switch doesn't know to which host in the virtual local network 200 it should send the packet. Accordingly, the L4/L7 switch drops the ICMP message. Thus, the originating host (e.g. $A_1$) never gets the ICMP packet and unwittingly continues to send packets to the required destination server without fragmentation. Thus, the packets from the originating host continue to be dropped by the intermediate router and never reach the destination.

However, an IP frame solves this problem because the removal of the MAC addresses therefrom means that it is no longer subject to the size limitations of the Ethernet protocol. As a result, large IP packets need not be fragmented by a gateway (intermediate router) to a LAN and can be transported in their entirety to a destination without being dropped by intermediate routers.

H.3 Enabling Layer 2 Redundancy

Figure 14:
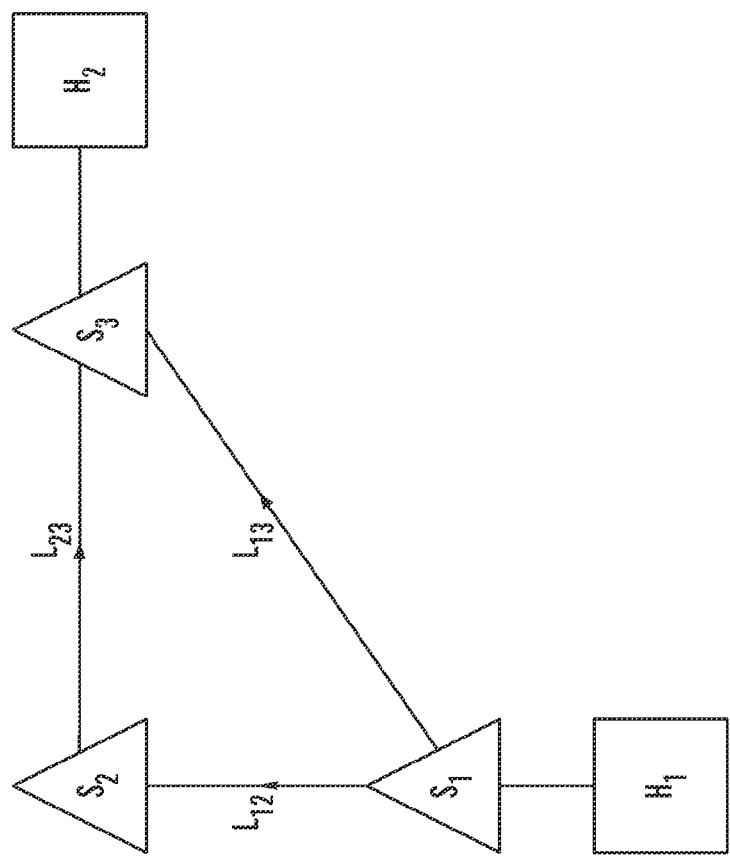
FIG. 14 is a block diagram of a conventional LAN switch looped arrangement.

Nowadays, layer 2 redundancy is designed in an active/backup link architecture. Referring to FIG. 14, a looped LAN switch comprises three LAN switches $S_1$, $S_2$ and $S_3$, wherein switches $S_1$ and $S_3$ are respectively connected to hosts $H_1$ and $H_2$. Switch $S_1$ is connected to switches $S_2$ and $S_3$ by lines $L_{12}$ and $L_{13}$ respectively. Similarly, switch $S_2$ is connected switch $S_3$ by line $L_{23}$. With this arrangement (which is also known as an $L_2$ loop), even if switch $S_2$ fails, hosts $H_1$ and $H_2$ can still communicate through switches $S_1$ and $S_3$ via line $L_{13}$. Thus, there is a first active link $L_{13}$ and an inactive link $L_{23}$ to switch $S_3$.

However, the looped LAN switch arrangement can give rise to problems with unicast flooding. For example, let host $H_1$ attempt to communicate with host $H_2$. Further, let host $H_1$ be unaware of the MAC address of host $H_2$. The switch $S_1$ issues a packet through all of its ports (apart from the one connected to host $H_1$). The packet travels through lines $L_{12}$ or $L_{13}$ to switches $S_2$ and $S_3$. Switches $S_2$ and $S_3$ will incorrectly associate the MAC address of host $H_1$ with their ports connected to lines $L_{12}$ or $L_{13}$ and in accordance with the normal dynamic learning procedure will add the MAC address of host $H_1$ to their MAC tables. If neither switch has learned the MAC address for host $H_2$ yet, they will unicast flood onto line $L_{23}$. Each switch will take the packet sent by the other switch and flood it back out again immediately, since they still don't know the MAC address of host $H_2$. The unicast packets will continue to be transmitted around the loop until the host $H_2$ replies whereupon its MAC address will be added to the switch's MAC address table and the unicast flooding will stop.

However, a much more serious problem arises with broadcast storms, wherein broadcast packets are broadcast, received and rebroadcast by each switch, so that the broadcast packets never leave (or stop travelling around) the loop. The increased traffic resulting from the never-ending broadcast and rebroadcast of these packets leads to traffic congestion and misconnections on the Internet. It will be understood that broadcast storms can also occur in redundant links between a single switch and a single host.

The spanning tree protocol overcomes unicast flooding loops and broadcast loops by breaking such loops. However, the spanning tree protocol takes about 50 seconds to perform such topology changes. A more recent protocol, namely the rapid spanning tree protocol takes only 1-2 seconds to perform such topology changes. Nevertheless, in many applications (e.g. voice over IP or video streaming) a 1-2 second delay is unacceptable.

The IP frame and IP switch overcomes the problems of broadcast storms by suppressing $L_2$ loops between improved IP routers, insofar as frames are natively transported without Ethernet encapsulation. In particular, only the preamble and CRC fields are conserved from an Ethernet frame. The resulting IP packets are directly switched by the IP switch on the basis of the IP destination addresses in the IP header field of the IP frame. In particular, the IP switch no longer uses MAC addresses to switch frames to an appropriate port. Thus, instead of performing a full broadcast (of a LAN switch), the IP switch performs a directed broadcast to all its IP peers with the IP address contained in the direct broadcast subnetwork. Similarly, instead of the afore-mentioned L2 active main link and inactive L2 backup link between a host and a conventional LAN switch, the IP switch permits the use of multiple active L3 links to a host. This feature enables load-balancing between routers, wherein this option would not otherwise have been available with a conventional LAN switch.

H.4 Enabling Layer 3 Redundancy

Figure 15:
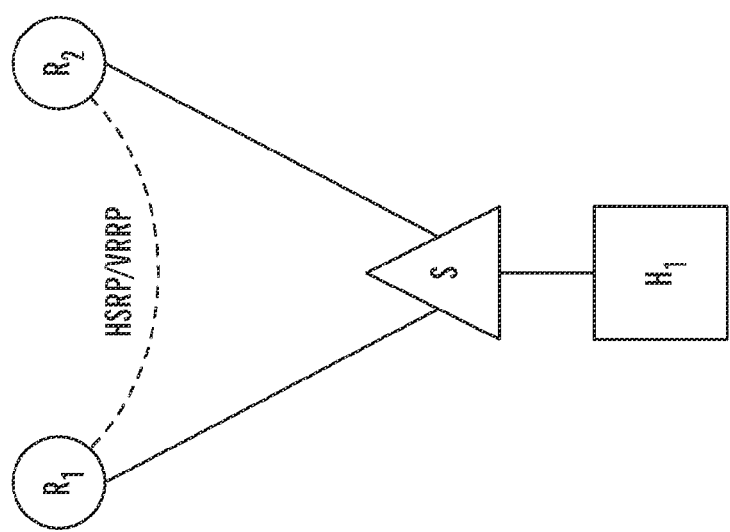
FIG. 15 is a block diagram of a redundant router arrangement, in accordance with embodiments of the present invention.

Referring to FIG. 15, to eliminate a single point of failure for clients on a network accessing the Internet, a network administrator might consider deploying two routers, $R_1$ and $R_2$ connected through a switch S to one or more hosts $H_1$-$H_n$. The TCP/IP settings of the hosts will have been configured with the IP address of a default gateway (router $R_1$). However, if router $R_1$ fails, a host $H_1$ will be left with a default gateway at an unreachable IP address. Similarly, if the host uses ARP to resolve the IP address of the default gateway to its MAC address, then even if the hardware of router $R_1$ is replaced, the host will still not have access to the Internet until its ARP cache has timed out or cleared.

The Virtual Router Redundancy Protocol (VRRP) is designed to guard against such failures, and to provide faster and more efficient failover in the event of an outage than traditional dynamic routing techniques. When VRRP is started, it provides a master router with a virtual media access control (VMAC) address, which is taken over by another router (i.e. a backup router) in the event of failover. By employing a virtual MAC address, network hosts need not change their default-gateway address in the event of failover. Thus, in effect, this system employs an L2 link between a host $H_1$ and switch S and an active and inactive L2 links between the switch S and routers $R_1$ and $R_2$ (to support the VRRP). One of the limitations of this approach is that standby routers are idle until a master router fails.

By not using MAC addresses, the IP switch enables the above-described redundant router structure to be modified. In particular, the conventional routers $R_1$ and $R_2$ are replaced by IP switches and a host directly connected thereto (by removing the interceding LAN switch) by multiple active L3 links. The availability of the multiple active L3 links between a host and an IP switch means that a backup IP router need not be dormant while the master router is active. Instead, both IP switches can be active at the same time, thereby enabling load-sharing therebetween.

Similarly, the IP switch no longer needs to use the spanning tree protocol to remove $L_2$ loops. Instead, the IP switch need only rely on dynamic IP routing protocols (e.g. OSPF) to identify the best next loop (route) for the IP frame to transmit it to its intended destination. This ensures that the convergence time of the IP switch is improved from 1-2 seconds (with the spanning tree protocol) to 200 ms (with OSPF), wherein this delay time is acceptable for real-time, delay-sensitive traffic such as voice over IP.

In addition, the IP switch and IP frame enable the replacement of active and inactive links with completely active links, thereby facilitating load-balancing (in a fashion similar to ECMP which is already provided under OSPF).

I. Other Features

In common with the IP switch, the Network Interface Cards (NIC) in hosts no longer transmit traditional Ethernet packets. Instead, with the IP frame, the NICs forward IP packets natively on the wire. The IP default gateway should be the directly attached IP switch. However, this is not essential. In particular, an IP default gateway is no longer required when there is only one NIC per host if a pair of NICs is used in redundancy mode. Thus, an IP default gateway is no longer needed and both NICs can be used in an active/active fashion, thereby providing the facility for load-sharing. In other words, the existing limitations of using active/backup links when using two NICs on an end-server no longer apply.

Furthermore, while a full duplex environment is still required on a LAN to transmit the improved frame, CSMA/CD is no longer needed. Neither the IP frame, nor the IP switch modify traditional IP multicast mechanisms. Indeed, general multicast mechanisms are simplified since IGMP snooping or CGMP are no longer required.

The present invention provides a computer program product comprising a storage medium having computer readable program code stored therein, said program code configured to be executed by a computer to cause the computer to perform the methods of the present invention.

The present invention provides a system comprising a computer configured execute program code stored in a storage medium to perform the methods described herein.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for modifying a switching table of an Internet Protocol (IP) switch, said method comprising:
providing the IP switch, wherein the IP switch comprises multiple ports, the switching table which comprises at least one entry, and a lifetime for each entry of the at least one entry, wherein the multiple ports comprise a plurality of access ports and a plurality of interswitch ports, wherein each access port is identified by a port identifier and is connected to a corresponding host in a Local Area Network (LAN), wherein the interswitch ports are configured to be statically connected to routers within the Internet to connect the routers together in connections that cannot be overwritten by a dynamic learning process, wherein each entry of the at least one entry comprises an IP address, a port identifier associated with the IP address and identifying a port of the multiple ports, and a routing protocol internal metric indicative of confidence in the entry, and wherein the IP switch does not comprise a Media Access Control (MAC) table that associates a MAC address of each host in the LAN with each host's associated port identifier;
receiving an incoming IP frame at a first access port of the plurality of access ports;
after said receiving the incoming IP frame, said IP switch validating the received IP frame;
after said validating, said IP switch reading from the IP frame an IP source address consisting of an address of a source from which the IP frame originated; and
after said reading the IP source address, said IP switch manipulating the switching table, wherein said manipulating the switching table comprises either:
creating in the switching table a new entry in which the IP address and the associated port identifier are respectively set equal to the IP source address and a port identifier of the first access port, respectively, resulting in the at least one entry being updated to include the new entry or
changing an existing entry of the at least one entry in dependence on the IP source address and the first access port.

2. The method of claim 1, wherein said manipulating consists of said creating.

3. The method of claim 2, wherein said creating comprises adding to the new entry a next hop and a next interface relating to the IP address in the new entry.

4. The method of claim 1, wherein said manipulating consists of said changing.

5. The method of claim 1, wherein the routing protocol internal metric indicative of confidence in the entry is an administrative distance for the entry.

6. The method of claim 5, wherein said manipulating consists of said creating, and wherein the method comprises:
after said reading and before said manipulating, ascertaining that the IP source address does not exist in any entry of the at least one entry;
after said ascertaining, performing said creating wherein said creating includes setting the administrative distance in the new entry equal to zero which denotes a directly connected physical link for the new entry; and
setting the lifetime for the new entry.

7. The method of claim 5, wherein said manipulating consists of said creating, and wherein the method comprises:
after said reading and before said manipulating, ascertaining that the IP source address exists in the existing entry of the at least one entry and that the administrative distance for the existing entry is not zero;
after said ascertaining, performing said creating wherein said creating includes setting the administrative distance in the new entry equal to zero which denotes a directly connected physical link for the new entry; and
setting the lifetime for the new entry.

8. The method of claim 5, wherein said manipulating consists of said changing, and wherein the method comprises:
after said reading and before said manipulating, ascertaining that the IP source address exists in the existing entry of the at least one entry and that the administrative distance for the existing entry is zero and that the port identifier in the existing entry and the port identifier of the first access port are not a same port identifier;
after said ascertaining, performing said changing wherein said changing includes overwriting the port identifier in the existing entry with the port identifier of the first access port; and
resetting the lifetime for the existing entry.

9. A computer program product comprising a tangible storage device having computer readable program code stored therein, said program code configured to be executed by a computer to cause the computer to perform a method for modifying a switching table of an Internet Protocol (IP) switch, wherein the IP switch comprises multiple ports, the switching table which comprises at least one entry, and a lifetime for each entry of the at least one entry, wherein the multiple ports comprise a plurality of access ports and a plurality of interswitch ports, wherein each access port is identified by a port identifier and is connected to a corresponding host in a Local Area Network (LAN), wherein the interswitch ports are configured to be statically connected to routers within the Internet to connect the routers together in connections that cannot be overwritten by a dynamic learning process, wherein each entry of the at least one entry comprises an IP address, a port identifier associated with the IP address and identifying a port of the multiple ports, and a routing protocol internal metric indicative of confidence in the entry, and wherein the IP switch does not comprise a Media Access Control (MAC) table that associates a MAC address of each host in the LAN with each host's associated port identifier, and wherein the method comprises:
receiving an incoming IP frame at a first access port of the plurality of access ports,
after said receiving the incoming IP frame, said IP switch validating the received IP frame;
after said validating, said IP switch reading from the IP frame an IP source address consisting of an address of a source from which the IP frame originated; and
after said reading the IP source address, said IP switch manipulating the switching table, wherein said manipulating the switching table comprises either:
creating in the switching table a new entry in which the IP address and the associated port identifier are respectively set equal to the IP source address and a port identifier of the first access port, respectively, resulting in the at least one entry being updated to include the new entry or
changing an existing entry of the at least one entry in dependence on the IP source address and the first access port.

10. The computer program product of claim 9, wherein said manipulating consists of said creating.

11. The computer program product of claim 10, wherein said creating comprises adding to the new entry a next hop and a next interface relating to the IP address in the new entry.

12. The computer program product of claim 9, wherein said manipulating consists of said changing.

13. The computer program product of claim 9, wherein the routing protocol internal metric indicative of confidence in the entry is an administrative distance for the entry.

14. The computer program product of claim 13, wherein said manipulating consists of said creating, and wherein the method comprises:
 after said reading and before said manipulating, ascertaining that the IP source address does not exist in any entry of the at least one entry;
 after said ascertaining, performing said creating wherein said creating includes setting the administrative distance in the new entry equal to zero which denotes a directly connected physical link for the new entry; and
 setting the lifetime for the new entry.

15. The computer program product of claim 13, wherein said manipulating consists of said creating, and wherein the method comprises:
 after said reading and before said manipulating, ascertaining that the IP source address exists in the existing entry of the at least one entry and that the administrative distance for the existing entry is not zero;
 after said ascertaining, performing said creating wherein said creating includes setting the administrative distance in the new entry equal to zero which denotes a directly connected physical link for the new entry; and
 setting the lifetime for the new entry.

16. The computer program product of claim 13, wherein said manipulating consists of said changing, and wherein the method comprises:
 after said reading and before said manipulating, ascertaining that the IP source address exists in the existing entry of the at least one entry and that the administrative distance for the existing entry is zero and that the port identifier in the existing entry and the port identifier of the first access port are not a same port identifier;
 after said ascertaining, performing said changing wherein said changing includes overwriting the port identifier in the existing entry with the port identifier of the first access port; and
 resetting the lifetime for the existing entry.

17. A system comprising a computer configured to execute program code stored in a storage medium to perform a method for modifying a switching table of an Internet Protocol (IP) switch, wherein the IP switch comprises multiple ports, the switching table which comprises at least one entry, and a lifetime for each entry of the at least one entry, wherein the multiple ports comprise a plurality of access ports and a plurality of interswitch ports, wherein each access port is identified by a port identifier and is connected to a corresponding host in a Local Area Network (LAN), wherein the interswitch ports are configured to be statically connected to routers within the Internet to connect the routers together in connections that cannot be overwritten by a dynamic learning process, wherein each entry of the at least one entry comprises an IP address, a port identifier associated with the IP address and identifying a port of the multiple ports, and a routing protocol internal metric indicative of confidence in the entry, and wherein the IP switch does not comprise a Media Access Control (MAC) table that associates a MAC address of each host in the LAN with each host's associated port identifier, and wherein the method comprises:
 receiving an incoming IP frame at a first access port of the plurality of access ports;
 after said receiving the incoming IP frame, said IP switch validating the received IP frame;
 after said validating, said IP switch reading from the IP frame an IP source address consisting of an address of a source from which the IP frame originated; and
 after said reading the IP source address, said IP switch manipulating the switching table, wherein said manipulating the switching table comprises either:
  creating in the switching table a new entry in which the IP address and the associated port identifier are respectively set equal to the IP source address and a port identifier of the first access port, respectively, resulting in the at least one entry being updated to include the new entry or
  changing an existing entry of the at least one entry in dependence on the IP source address and the first access port.

18. The system of claim 17, wherein said manipulating consists of said creating.

19. The system of claim 18, wherein said creating comprises adding to the new entry a next hop and a next interface relating to the IP address in the new entry.

20. The system of claim 17, wherein said manipulating consists of said changing.

21. The system of claim 17, wherein the routing protocol internal metric indicative of confidence in the entry is an administrative distance for the entry.

22. The system of claim 21, wherein said manipulating consists of said creating, and wherein the method comprises:
 after said reading and before said manipulating, ascertaining that the IP source address does not exist in any entry of the at least one entry;
 after said ascertaining, performing said creating wherein said creating includes setting the administrative distance in the new entry equal to zero which denotes a directly connected physical link for the new entry; and
 setting the lifetime for the new entry.

23. The system of claim 21, wherein said manipulating consists of said creating, and wherein the method comprises:
 after said reading and before said manipulating, ascertaining that the IP source address exists in the existing entry of the at least one entry and that the administrative distance for the existing entry is not zero;
 after said ascertaining, performing said creating wherein said creating includes setting the administrative distance in the new entry equal to zero which denotes a directly connected physical link for the new entry; and
 setting the lifetime for the new entry.

24. The system of claim 21, wherein said manipulating consists of said changing, and wherein the method comprises:
 after said reading and before said manipulating, ascertaining that the IP source address exists in the existing entry of the at least one entry and that the administrative distance for the existing entry is zero and that the port identifier in the existing entry and the port identifier of the first access port are not a same port identifier;
 after said ascertaining, performing said changing wherein said changing includes overwriting the port identifier in the existing entry with the port identifier of the first access port; and
 resetting the lifetime for the existing entry.

25. A method for populating a switching table of an Internet Protocol (IP) switch, said method comprising:
 providing the IP switch, wherein the IP switch comprises multiple ports and the switching table which is configured to comprise at least one entry, wherein the multiple ports comprise a plurality of access ports and a plurality of interswitch ports, wherein each access port is identified by a port identifier and is connected to a corresponding host in a Local Area Network (LAN), wherein the interswitch ports are configured to be statically connected to routers within the Internet to connect the routers together in connections that cannot be overwritten by a dynamic learning process, wherein each entry of the at least one entry comprises an IP address, a port identifier associated with the IP address and identifying a port of the multiple ports, and a routing protocol internal metric indicative of confidence in the entry, and wherein the IP switch does not comprise a Media Access Control (MAC) table that associates a MAC address of each host in the LAN with each host's associated port identifier;

said IP switch receiving, from a requesting host of the LAN at the access port connected to the requesting host, a dynamic host configuration protocol (DHCP) option 43 request comprising a host name of the requesting host;

said IP switch transmitting the received request to a DHCP server;

said IP switch intercepting a DHCP response from the DHCP server for the request;

said IP switch extracting an IP address from the intercepted DHCP response, wherein the extracted IP address is linked with the host name of the requesting host; and said IP switch adding the extracted IP address to a corresponding entry of the switching table that is specific to the access port connected to the requesting host.

* * * * *